United States Patent
Rhodes

(10) Patent No.: US 7,111,640 B2
(45) Date of Patent: Sep. 26, 2006

(54) TWO-HANDLE FAUCET DESIGN WITH MANIFOLD ABOUT FAUCET HANDLES

(75) Inventor: Stephen Miles Rhodes, Mustang, OK (US)

(73) Assignee: Masco Corporation of Indiana, Indianapolis, IN (US)

( * ) Notice: Subject to any disclaimer, the term of this patent is extended or adjusted under 35 U.S.C. 154(b) by 251 days.

(21) Appl. No.: 10/642,855

(22) Filed: Aug. 18, 2003

(65) Prior Publication Data

US 2005/0039801 A1      Feb. 24, 2005

(51) Int. Cl.
*F16K 11/20* (2006.01)
(52) U.S. Cl. .................................. 137/606; 137/801
(58) Field of Classification Search ............ 137/606 I, 137/801; 251/310
See application file for complete search history.

(56) References Cited

U.S. PATENT DOCUMENTS

| | | | | |
|---|---|---|---|---|
| 715,623 | A | * | 12/1902 | Stretch et al. ............... 251/310 |
| 783,313 | A | * | 2/1905 | Roberts ...................... 137/606 |
| 1,878,097 | A | * | 9/1932 | Bletcher et al. ............ 137/606 |
| 4,005,728 | A | | 2/1977 | Thorp |
| 4,395,018 | A | | 7/1983 | Moen |
| 4,538,646 | A | | 9/1985 | Yang |
| 4,557,288 | A | | 12/1985 | Botnick |
| 4,577,656 | A | * | 3/1986 | Beltran ........................ 251/310 |
| 4,671,316 | A | | 6/1987 | Botnick |
| 4,699,358 | A | * | 10/1987 | Iqbal .......................... 251/310 |
| 4,760,861 | A | | 8/1988 | Botnick |
| 4,762,143 | A | | 8/1988 | Botnick |
| 4,928,732 | A | | 5/1990 | Hu |
| 5,417,348 | A | * | 5/1995 | Perrin et al. ................ 137/606 |
| 5,970,534 | A | | 10/1999 | Breda |
| 6,062,251 | A | * | 5/2000 | Pitsch ........................ 137/606 |
| 6,202,686 | B1 | | 3/2001 | Pitsch |

FOREIGN PATENT DOCUMENTS

| | | |
|---|---|---|
| EP | 0 307 105 | 3/1989 |
| FR | 1 476 080 | 4/1967 |
| FR | 2 565 658 | 12/1985 |

OTHER PUBLICATIONS

International Search Report, dated Sep. 28, 2004.

* cited by examiner

*Primary Examiner*—Stephen M. Hepperle
(74) *Attorney, Agent, or Firm*—Carlson, Gaskey & Olds

(57) ABSTRACT

A faucet design includes a pair of handles that may be turned relative to a spout body to control the flow of hot and cold water delivered to a spout outlet. The spout body is positioned vertically above the handles. Water is delivered into the spout body through the unique flow of water along a shaft of the handles. The unique water flow within the handles provides the freedom to position the spout body vertically above the handles.

9 Claims, 4 Drawing Sheets

TWO-HANDLE FAUCET DESIGN WITH MANIFOLD ABOUT FAUCET HANDLES

BACKGROUND OF THE INVENTION

This invention relates to a two-handle faucet design wherein a single manifold receives the combined fluid from a hot and a cold water supply line, and wherein the faucet handles are mounted vertically below the manifold.

In modern faucet designs, there are a variety of operational positions for the faucet handles, and the faucet spout. In most modern faucets, flow tubes extend through a hollow spout body to an outlet spout. The handles for controlling the flow of hot and cold water are positioned vertically above this hollow spout housing. By turning the handles, one can control the mixture of hot and cold water delivered to the spout outlet.

These designs typically require brazing at each of several fluid connections between the tubes, and the various fluid flow passages. It would be desirable to eliminate the requirement for brazing.

Further, it is a goal of modern faucet design to be able to have as many available operational positions for the handle and spout body as is possible. Thus, the restriction that to date has required the spout body to be vertically below the handle is somewhat undesirable.

SUMMARY OF THE INVENTION

In the disclosed embodiment of this invention, a spout body is positioned vertically above the two handles in a faucet. The faucet handles may be turned to control the amount of hot and cold water delivered to a spout outlet.

In particular, the spout handles preferably include a central passage extending through a central handle axis, and allowing the water to flow along the length of the handle axis to an outlet. The outlet is connected to the spout body such that the outlets of each of the hot and cold lines are delivered to the spout outlet.

In one preferred embodiment, the spout body is a hollow manifold, which does not include any separate tubing, etc. In a second embodiment, tubing, as is generally known in the faucet art, may be utilized.

These and other features of the present invention can be best understood from the following specification and drawings, the following of which is a brief description.

DETAILED DESCRIPTION OF THE PREFERRED EMBODIMENT

Figure 1:
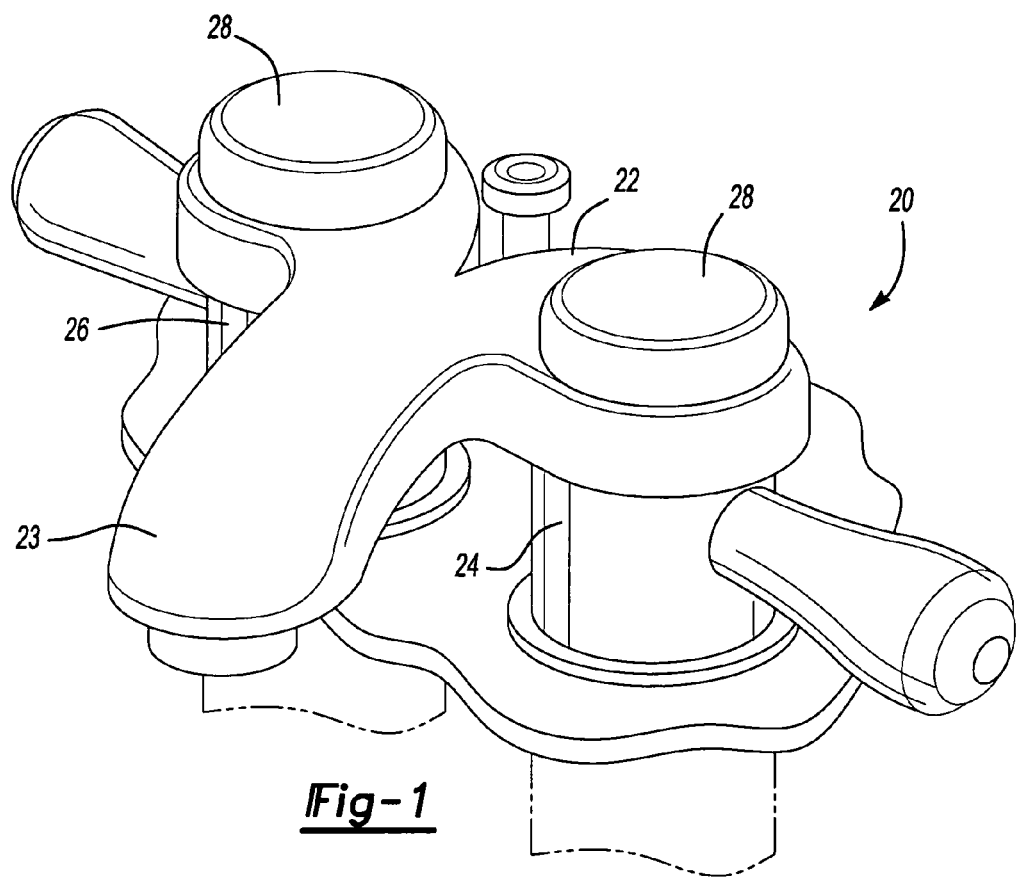
FIG. 1 is a perspective view of an inventive faucet arrangement.

FIG. 1 shows a faucet 20 having a spout body 22 leading to a spout 23. A pair of handles 24 and 26 may be turned to control the mix of hot and cold water leading to the outlet 23.

As shown, the faucet handles 24 and 26 are each associated with a cap 28 mounted above the spout body 22.

Figure 2A:
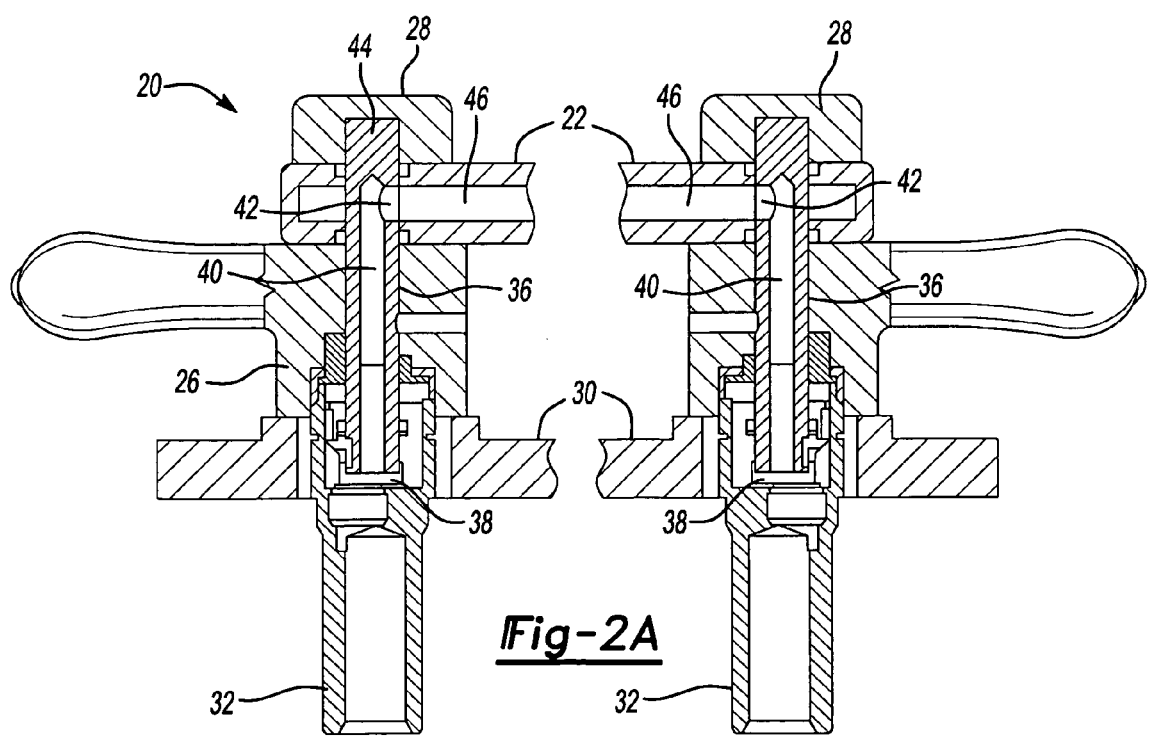
FIG. 2A is a cross-sectional view of the FIG. 1 embodiment.

In the prior art, the spout body has typically been positioned vertically below the handles. The present invention is unique in mounting the spout body above the handles. Aspects of the inner structure of the faucet handle provide this flexibility. In particular, as shown in FIG. 2A, the handles 24 and 26 are mounted in a deck 30. Each of the handles communicates with a respective water supply line 32. As is known, one line 32 supplies hot water and one supplies cold water.

Figure 2B:
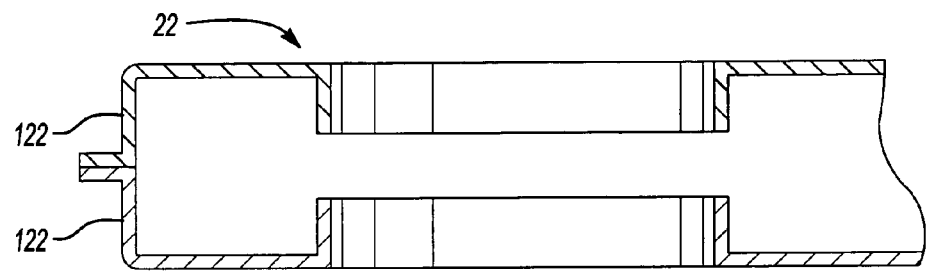
FIG. 2B adds a detail to the FIG. 2 embodiment.

Each of the handles has an inner rotating shaft 36 having a valve 38 at a lower end. The valve may be as known, and prevents or allows the flow of water from its respective line 32 upon turning of the handle 24 or 26. As is shown, a water supply line 40 leads through the shaft 36 to an outlet 42 extending radially outwardly of the shaft. This is a unique feature of the invention, and provides the ability to have the spout body 22 mounted vertically above the handle. As shown in FIG. 2A, the spout body 22 is a hollow manifold formed of one-piece hollow casting. The inlet 46 into the manifold receives the water from the outlet 42 and mixes and communicates the water to the spout outlet 23. As can be appreciated, and as shown in FIG. 2B, the manifold may be hollow, and formed of two pieces 122 which are mounted together to provide a fluid tight, yet simple arrangement. That is, FIG. 2B shows an alternative embodiment wherein the manifold is formed of two pieces. While stamped pieces are shown, the two stamped pieces could be replaced by a clam shell design. The pieces may be sealed with sealant and then crimped. Further, the pieces may be castings, plastic injection molded, hydro formed or formed by various other methods. Essentially, the inventive manifold is preferably formed of brass or plastic, although other materials may be utilized. The inventive manifold thus provides all of the mixing and flow delivery structure between the outlets of the faucet passages and the spout. This eliminates all of the many flow tubes, etc. which are required in the prior art.

As shown in FIG. 2A, an upper end 44 of the shaft 36 is received within the cap 28. Thus, as shown here, due to the flow through the shaft 36, the water is delivered above the handle and into the spout body 22. As shown in this figure, the spout body is a hollow manifold.

Figure 2C:
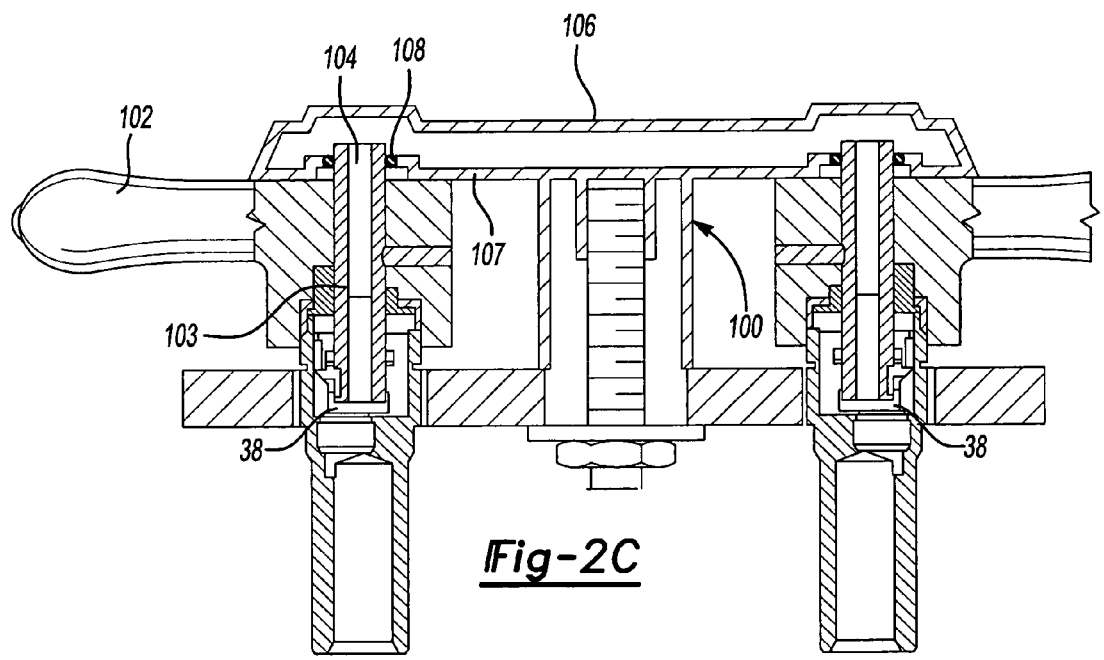

As shown in FIG. 2C, in another embodiment 100, the handle 102 rotates the shaft 103 having a passage 104. Shaft 103 is mounted within an opening 108 in a lower plate 107 of the manifold 106. Otherwise, the valving, etc., operates as in the FIG. 2A embodiment.

Figure 3A:
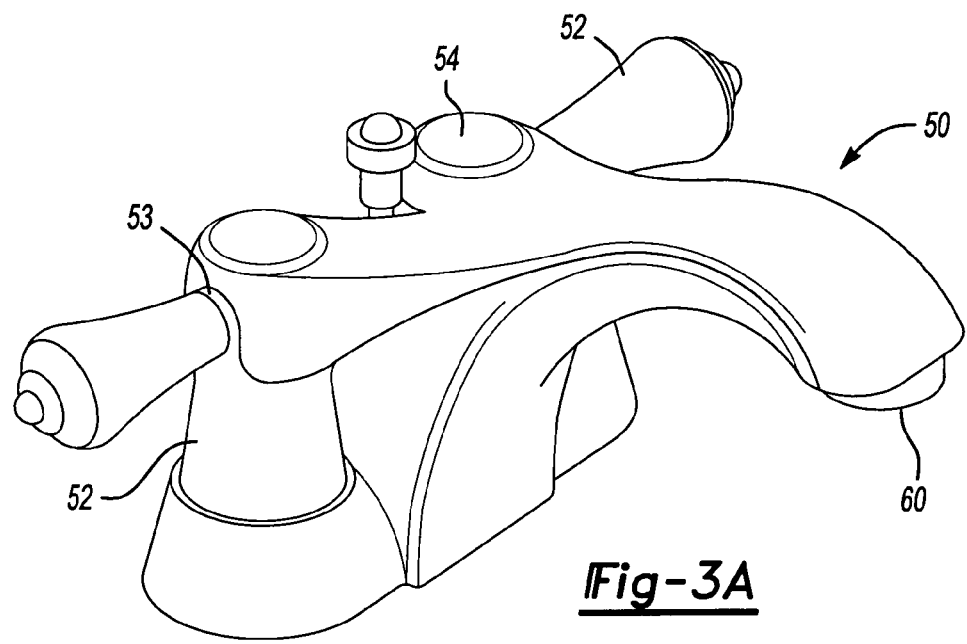
FIG. 3A is a perspective view of a second embodiment.

FIG. 3A shows another embodiment 50 wherein the handles 52 turn relative to a central cover 54. From FIG. 3A it can be appreciated that the handles 52 each have a side wedged portion 53 that allows the handle to turn relative to the cover 54.

Figure 3B:
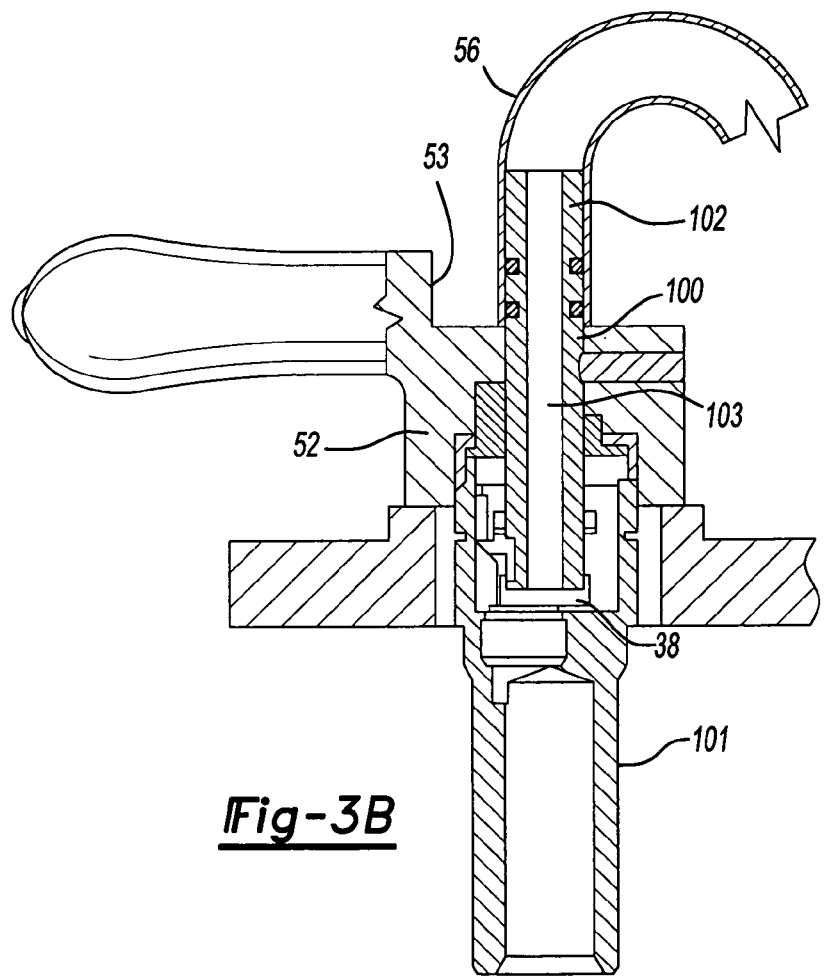
FIG. 3B is a detail of the FIG. 3 embodiment.

As can be appreciated from FIG. 3B, the handles 52 each include central shafts 100 which communicate with a water supply line 101 as in the prior art. A passage 103 passes through the shaft 100 as in the prior art to an upward position 102. Thus, water flows through the entire axial length of the shaft 100 into the tubes 56.

Within the cover 54 is a pair of tubes 56 which communicate the water from the passages 102 shown in FIG. 3B into the tubes 54 and 56. From the tubes 56, the water is communicated through the forward extending lines 58 to the spout outlet 60 (see FIG. 4).

Figure 4:
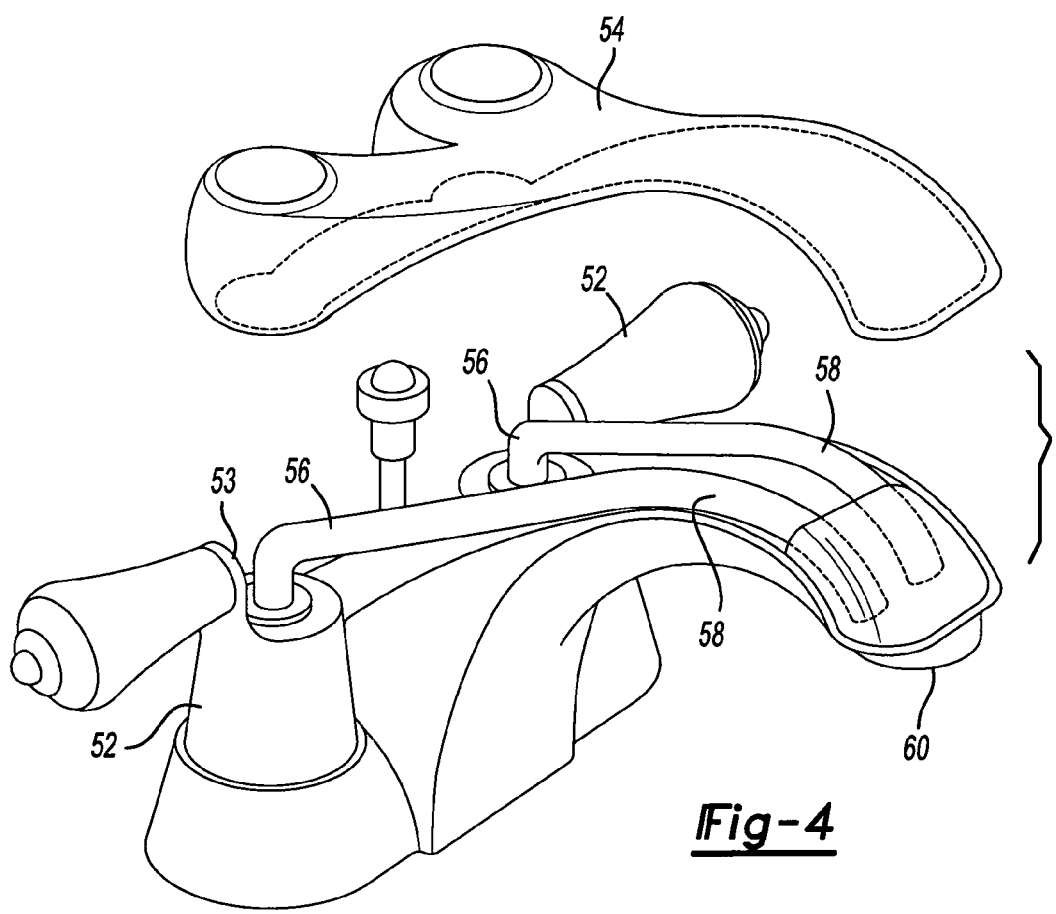
FIG. 4 is a partially exploded view of the FIG. 3 embodiment.

As shown in FIG. 4, with the cap 54 removed, the tubes 56 and 58 can be seen to extend through a remainder 60 of the spout body.

Figure 5:
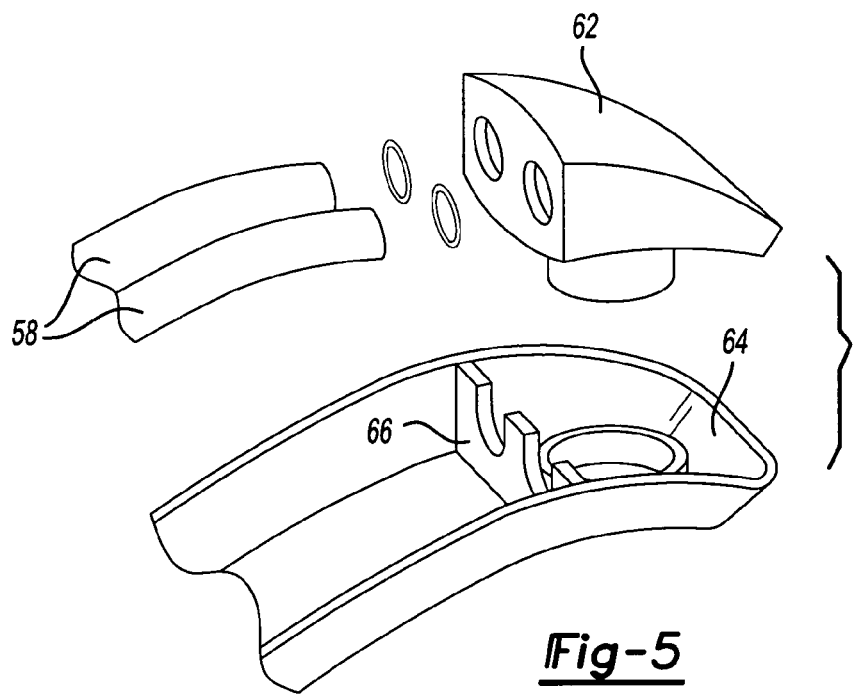
FIG. 5 shows the detail of the FIGS. 3 and 4 embodiments.

As shown in FIG. 5, a forward end 62 is received in an outlet 64 of the spout body. Further, a support structure 66 will support the tubes 58 at the location where they are mounted to the outlet 62.

Although preferred embodiments of this invention has been disclosed, a worker of ordinary skill in this art would recognize that certain modifications would come within the scope of this invention. For that reason, the following claims should be studied to determine the true scope and content of this invention.

What is claimed is:

1. A faucet comprising:
   a spout body for receiving a supply of a heated water and a cooler water, and mixing and delivering water to a spout outlet, said spout body being positioned at a first upper vertical position; and
   a pair of handles each being capable of being turned relative to said spout body to control the amount of heated and cooler water being delivered into said spout body, said handles being positioned at a second vertical position, below said first vertical position, said pair of handles each turning about an axis, said axes being spaced and parallel, and water passing through said handles, and mixing downstream of said handles, and the heated and cooler water not mixing until a location downstream of having passed through said pair of handles; wherein each said handle turns with a central shaft and water being supplied through a water supply line in said central shaft.

2. A faucet as set forth in claim 1, wherein said central shaft has a radial outer surface, and said water supply line leading through said shaft and then extending radially outwardly to said radial outer surface.

3. A faucet as set forth in claim 1, wherein said spout body is a hollow manifold for receiving said heated and cooled water and mixing said heated and cool water within said hollow manifold.

4. A faucet comprising:
   a spout body for receiving a supply of a heated water and a cooler water, and mixing and delivering water to a spout outlet, said spout body being positioned at a first upper vertical position;
   a pair of handles each being capable of being turned relative to said spout body to control the amount of heated and cooler water being delivered into said spout body, said handles being positioned at a second vertical position, below said first vertical position;
   each said handle turns with a central shaft, and water being supplied through a water supply line in said central shaft;
   each said central shaft has a radial outer surface, and said water supply line leading through said shaft and then extending radially outwardly to said radial outer surface, through a radially outwardly extending port; and
   said shaft extends above said radially outwardly extending outlet port, and a cap is received on each said shaft on a remote side of said spout body from each said handle.

5. A faucet comprising:
   a spout body for receiving a supply of a heated water and a cooler water, and mixing and delivering water to a spout outlet, said spout body being positioned at a first upper vertical position;
   a pair of handles each being capable of being turned relative to said spout body to control the amount of heated and cooler water being delivered into said spout body, said handles being positioned at a second vertical position, below said first vertical position;
   each said handle turns with a central shaft, and water being supplied through a water supply line in said central shaft; and
   said shafts extend into a lower face of a manifold, and is supported within a lower face of said manifold, and a water supply line extending axially through said shaft.

6. A faucet comprising:
   a spout body for receiving a supply of a heated water and a cooler water, and mixing and delivering water to a spout outlet, said spout body being positioned at a first upper vertical position;
   a pair of handles each being capable of being turned relative to said spout body to control the amount of heated and cooler water being delivered into said spout body, said handles being positioned at a second vertical position, below said first vertical position;
   each said handle turns with a central shaft, and water being supplied through a water supply line in said central shaft; and
   said water extends through the entirety of said shaft to a vertically upper end of said shaft and into a tube, said lube communicating through said spout body to said outlet.

7. A faucet as set forth in claim 6, wherein said spout body includes a removable cover for covering said tubes.

8. A faucet as set forth in claim 6, wherein said tubes extend to an outlet fitting, said outlet fitting being positioned at an outlet in said spout body.

9. A faucet as set forth in claim 8, wherein said tubes are supported in tube support structure adjacent to said fitting.

* * * * *

UNITED STATES PATENT AND TRADEMARK OFFICE
CERTIFICATE OF CORRECTION

PATENT NO.        : 7,111,640 B2                                              Page 1 of 1
APPLICATION NO. : 10/642855
DATED             : September 26, 2006
INVENTOR(S)       : Stephen Miles Rhodes It is certified that error appears in the above-identified patent and that said Letters Patent is hereby corrected as shown below:

Column 4, line 40: "lube" should be --tube--

Signed and Sealed this

Twelfth Day of December, 2006

JON W. DUDAS
*Director of the United States Patent and Trademark Office*